(12) United States Patent
Storteig et al.

(10) Patent No.: US 8,570,830 B2
(45) Date of Patent: Oct. 29, 2013

(54) ACTIVE STEERING SYSTEMS AND METHODS FOR MARINE SEISMIC SOURCES

(75) Inventors: Eskild Storteig, Lierskogen (NO);
Kenneth E. Welker, Nesoya (NO);
Martin N. Howlid, Slependen (NO);
Rune Toennessen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 9 days.

(21) Appl. No.: 12/831,347

(22) Filed: Jul. 7, 2010

(65) Prior Publication Data

US 2011/0002193 A1    Jan. 6, 2011

Related U.S. Application Data

(63) Continuation of application No. 11/385,440, filed on Mar. 21, 2006, now Pat. No. 7,804,738.

(51) Int. Cl.
*G01V 1/38* (2006.01)

(52) U.S. Cl.
USPC ............................................................ 367/16

(58) Field of Classification Search
USPC ...................... 367/15–19, 153–154
See application file for complete search history.

(56) References Cited

U.S. PATENT DOCUMENTS

| | | | |
|---|---|---|---|
| 3,193,045 A | 7/1965 | Levin | |
| 3,219,968 A | 11/1965 | Loper et al. | |
| 3,274,608 A | 9/1966 | Ewing et al. | |
| 3,350,683 A | 10/1967 | Sengbush | |
| 3,441,901 A | 4/1969 | Cawley et al. | |
| 3,560,912 A | 2/1971 | Spink et ai. | |
| 3,605,674 A | 9/1971 | Weese | |
| 3,644,882 A | 2/1972 | Burg | |
| 3,670,988 A * | 6/1972 | Leonard | 242/397.2 |
| 3,774,570 A | 11/1973 | Pearson | |
| 3,831,136 A | 8/1974 | Sagoci | |

(Continued)

FOREIGN PATENT DOCUMENTS

| | | | |
|---|---|---|---|
| EP | 0613025 B1 | 2/1994 | |
| GB | 2414804 A | * 12/2005 | |

(Continued)

OTHER PUBLICATIONS

Qin et al., "An Overview of Industrial Model Predictive Control Technology," 1996, Retrieved Jan. 29, 2007; pp. 1-2, <http://www.che.utexas.edu/~qin/cpcv/cpcv14.html>.

*Primary Examiner* — Krystine Breier

(57) ABSTRACT

Systems and methods for automatic steering of marine seismic sources are described. One system comprises a marine seismic spread comprising a towing vessel and a seismic source, the seismic source comprising one or more source arrays each having a center of source array, each source array having one or more source strings; a seismic source deployment sub-system on the towing vessel, the sub-system controlled by a controller including a software module, the software module and the deployment sub-system adapted to control an inline distance between one of the centers of source array and a target coordinate. It is emphasized that this abstract is provided to comply with the rules requiring an abstract, allowing a searcher or other reader to quickly ascertain the subject matter of the technical disclosure. It is submitted with the understanding that it will not be used to interpret or limit the scope or meaning of the claims.

14 Claims, 12 Drawing Sheets

(56) References Cited

U.S. PATENT DOCUMENTS

| | | |
|---|---|---|
| 4,016,531 A | 4/1977 | Cook et al. |
| 4,079,353 A | 3/1978 | Jenkinson |
| 4,404,664 A | 9/1983 | Zachariadis |
| 4,405,036 A | 9/1983 | Wener et al. |
| 5,284,323 A | 2/1994 | Pawkett |
| 5,443,027 A | 8/1995 | Owsley et al. |
| 6,504,792 B2 | 1/2003 | Barker |
| 6,525,992 B1 | 2/2003 | Olivier et al. |
| 6,590,831 B1 | 7/2003 | Bennett et al. |
| 6,671,223 B2 | 12/2003 | Bittleston |
| 6,775,618 B1 | 8/2004 | Robertsson et al. |
| 7,047,898 B2 | 5/2006 | Petersen et al. |
| 7,415,936 B2 | 8/2008 | Storteig et al. |
| 7,804,738 B2 | 9/2010 | Storteig et al. |
| 2005/0219948 A1 | 10/2005 | Naess |
| 2008/0175097 A1 | 7/2008 | Storteig et al. |

FOREIGN PATENT DOCUMENTS

| | | |
|---|---|---|
| GB | 2429541 A | 12/2010 |
| WO | 2004092771 A2 | 10/2004 |
| WO | WO 2005096018 A1 * | 10/2005 |

* cited by examiner

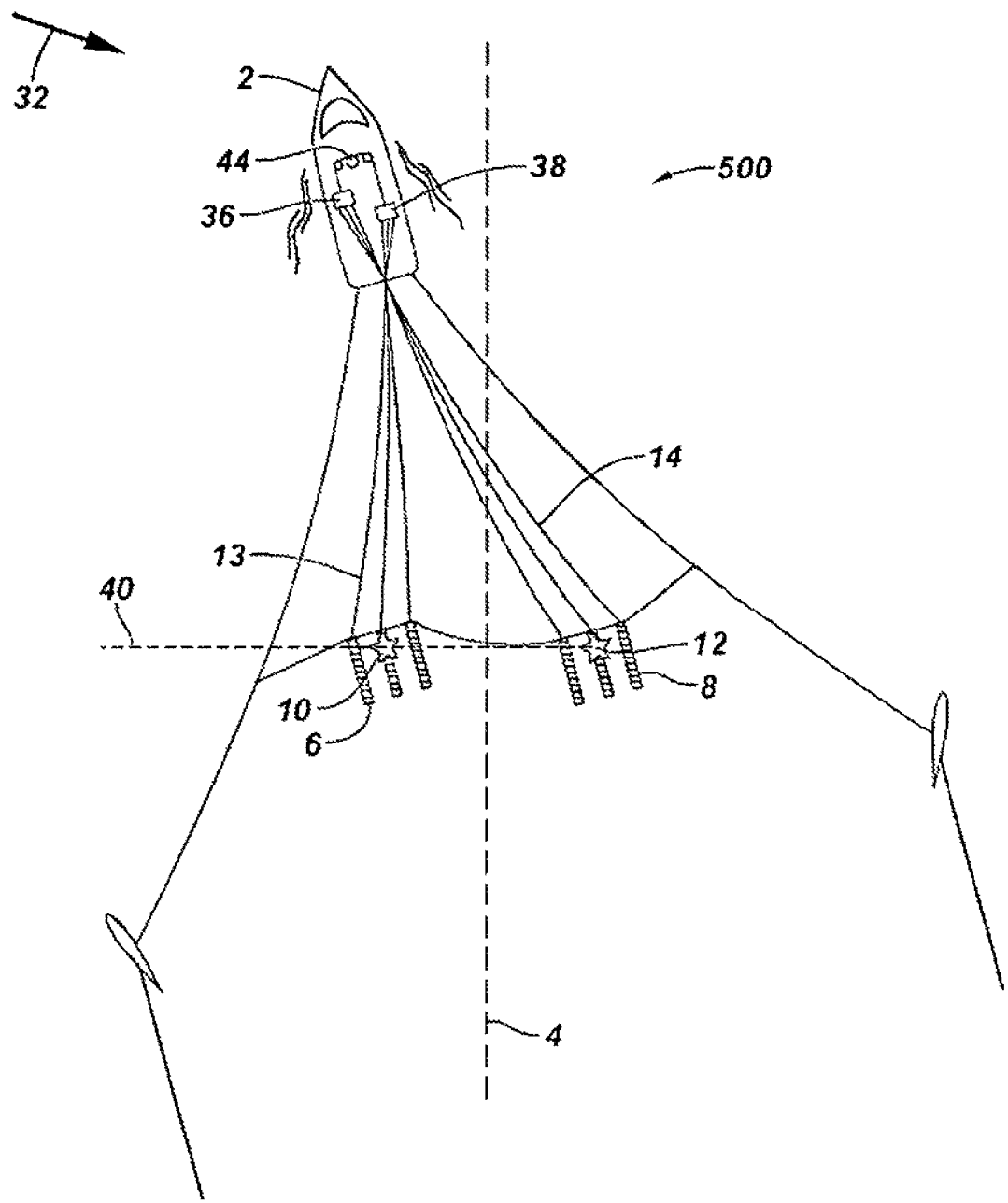

ACTIVE STEERING SYSTEMS AND METHODS FOR MARINE SEISMIC SOURCES

CROSS REFERENCE TO RELATED APPLICATION

This is a continuation of U.S. application Ser. No. 11/385,440, entitled "Active Steering Systems and Methods for Marine Seismic Sources", filed Mar. 21, 2006 now U.S. Pat. No. 7,804,738, in the name of the inventors Eskild Storteig et al., and commonly assigned herewith. The earlier effective filing date of that application is hereby claimed under 35 U.S.C. §120. That application is also hereby incorporated by reference for all purposes as if set forth herein verbatim.

BACKGROUND OF THE INVENTION

1. Field of Invention

The present invention relates to the field of marine seismic data acquisition systems and methods of using same. More specifically, the invention relates to systems and methods for active steering of marine seismic sources to maintain inline position of the seismic sources.

2. Related Art

The performance of a marine seismic acquisition survey typically involves one or more vessels towing at least one seismic streamer through a body of water believed to overlie one or more hydrocarbon-bearing formations. In order to perform a 3-D marine seismic acquisition survey, an array of marine seismic streamers, each typically several thousand meters long and containing a large number of hydrophones and associated electronic equipment distributed along its length, is towed at about 5 knots behind a seismic survey vessel. The vessel also tows one or more seismic sources suitable for use in water, typically air guns. Acoustic signals, or "shots," produced by the seismic sources are directed down through the water into the earth beneath, where they are reflected from the various strata. The reflected signals are received by the hydrophones, or receivers, carried in the streamers, digitized, and then transmitted to the seismic survey vessel where the digitized signals are recorded and at least partially processed with the ultimate aim of building up a representation of the earth strata in the area being surveyed. Often two or more sets of seismic data signals are obtained from the same subsurface area. These sets of seismic data signals may be obtained, for instance, by conducting two or more seismic surveys over the same subsurface area at different times, typically with time lapses between the seismic surveys varying between a few months and a few years. In some cases, the seismic data signals will be acquired to monitor changes in subsurface reservoirs caused by the production of hydrocarbons. The acquisition and processing of time-lapsed three dimensional seismic data signals over a particular subsurface area (commonly referred to in the industry as "4-D" seismic data) has emerged in the last decade or so as an important new seismic prospecting methodology. When conducting repeated surveys, ideally one wants to repeat all source and receiver positions from the base or previous survey. In practice, this is hard to achieve for the entire survey area due to the different environmental conditions encountered in different surveys. Varying currents, both spatially and in time, are the main environmental contributor.

When conducting surveys today, a reference point at the vessel is steered automatically to be at a certain cross line distance from a given pre-plot track. A controller may be used for this, and it controls the autopilot mechanism to achieve its goal. The operator sets manually how far the vessel is to be cross-line from the pre-plot line. Conventionally, seismic source arrays are deployed so that fixed distances are maintained from the towing vessel and from the center of the first seismic recording group of the streamers. During the course of an acquisition line, these distances may change due to several factors including crossline current that introduces an angle to the relation between the line from the towing cable/rope and the seismic line direction, often called feather angle when used to describe the same relation but for streamers. In addition to crossline feather, changes in the inline component of the current may alter the tension on the towing ropes for individual source arrays, which may then stretch or contract, changing the distances from the vessel to the to the source arrays, and from the source arrays to the center of the first seismic recording group.

While adjustments may be made during line change, no mechanism is currently employed to control these separation distances in real time during the course of a marine seismic data acquisition run. This lack of control may result in inline differences between the source coordinates from a base and monitor 4D survey

SUMMARY OF THE INVENTION

In accordance with the present invention, systems and methods are described for inline positioning of one or more acoustic centers of marine seismic sources using control of one or more source deployment components on a vessel. Systems and methods of the invention may be used during seismic data collection, including 3-D and 4-D seismic surveying. The inventive systems and methods may also use inline, as well as crossline control to reform a multi-string source shape in real time or near-real time, and/or for time recording with time and space source firing. In another use of the invention, the ability to move the source into position using both control of the vessel speed and inline source control makes it possible to conduct an undershoot without the source vessel receiving the aim point message. Data transfer that is not time critical can be achieved with the limited bandwidth available from satellite communications eliminating the need and cost for a dedicated line of sight radio effort. Normally, in an undershoot project; the line of sight is needed for transmitting the aim point message from the recording vessel to the source vessel. Instead the vessels shoot on time, with highly synchronized and precise clocks.

The systems and methods of the present invention may include a software module that has knowledge of the inline source positions in relation to target coordinates from a previous survey and an ongoing acquisition. One objective of the software is to control one or more source deployment components that can change the position of one or more sources in relation to the towing vessel in a way that will drive the difference between these two inline coordinates to zero. The software may also have knowledge of a target distance between the center first group (CFG) of a streamer spread and the center of the source (COS) and/or the center of one or more source arrays (COSA) and control the physical mechanism to achieve that target distance. This of course requires that the positions of both the CFG and the COS or COSA, as the case may be, are known.

The systems and methods of the invention may include one or more source deployment components controlled by the software module. Acting in concert, the software module and source deployment components control the inline distances of the COSA of each array in relation to a target coordinate, which may be either reference mentioned above, (i.e., the base survey source coordinates or the distance between a COS of a source array and CFG of a streamer spread). One useful source deployment component is the so-called gun cable winch. A gun cable winch winds and unwinds a pneumatically pressurized cable from the source towing vessel to the source array (gun cables) in or out, changing the distance from the winch to the source array. Gun cable winches are not typically designed to change the length of gun cable dynamically during acquisition when the cables are pressurized.

A first aspect of the invention are systems comprising:
(a) a marine seismic spread comprising a towing vessel and a seismic source, the seismic source comprising one or more source arrays each having a center of source array, each source array having one or more source strings;
(b) a seismic source deployment sub-system on the towing vessel, the sub-system controlled by a controller including a software module, the software module and the deployment sub-system adapted to control an inline distance between one of the centers of source array and a target coordinate.

Systems of the invention include those wherein optionally one or more seismic streamers are towed by the towing vessel, or a separate towing vessel may tow one or more streamers. The seismic source deployment sub-system may comprise one or more winches, capstans, or the like, for example a port side winch and a starboard side winch, controlled by the controller software module. In these embodiments, the individual source strings in a source array are actuated pneumatically or electronically through individual active cables wound or unwound from winches. The port winch may be wound a substantially similar amount as the starboard side winch is unwound, or vice versa. Alternatively, the source deployment sub-system may comprise both active source cables and passive steering cables. In one embodiment, the length of active, source cables are not controlled but are allowed to move inline, while a set of separate passive cables are connected either to the active cables or the sources themselves. The passive cables do not actuate the sources, but their inline lengths are controlled by separate deployment systems, for example winches, to control an inline distance between one of the centers of source array and a target coordinate. In certain embodiments, the seismic source deployment sub-system may be load-balanced, wherein for example port and starboard winches are controlled to move oppositely. In certain embodiments, the source deployment sub-system may comprise movable winches, wherein the winch does not wind or unwind per se, but rides on a movable platform. Combinations of these may also be employed, in other words, the controller and software module may control both the movable platform and the winding and unwinding of the winches. In yet other embodiments, heave compensators may be employed, whereby the length of either active source cables or passive steering cables are adjusted by exerting a force on the cable out of line of the cable, as explained further herein. Load-balancing may be employed in any of the various embodiments of the invention, which may reduce energy consumption.

The controller and software module may be physically a part of the seismic source deployment sub-system or located separately from the seismic source deployment subsystem, and may use some or all available information, including, but not limited to, source and vessel positions, vessel gyroscope reading, vessel compass reading, vessel speed log, streamer front end positions (if streamers are present), and historical, real-time, and future current and wind information and predictions when calculating a difference between a target position and actual position, and thus these may taken into consideration in the calculation of optimum source cable and/or steering cable position by the seismic source deployment sub-system. The phrase "seismic source deployment sub-system" is defined herein and may differ among the various embodiments of the invention, as explained in the definition. The controller and software module may include logic selected from PI controllers, PID controllers (including any known or reasonably foreseeable variations of these), and computes a residual equal to a difference between a target point 3D coordinate COSA position and an actual COSA position, optionally together with current and wind measurements, to produce one or more inputs to cable deployment actuator, which may be electric motors, used by the seismic source deployment subsystem to control the source inline positions using winches, motorized capstans, and the like. The controller may compute the residual continuously or non-continuously. Other possible implementations of the invention are those wherein the controller comprises more specialized control strategies, such as strategies selected from feed forward, cascade control, internal feedback loops, model predictive control, neural networks, and Kalman filtering techniques.

Systems of the invention may include a seismic spread comprising one or more vessels such as towing vessels, a chase vessel, a work vessel, one or more a seismic sources, and optionally one or more seismic streamers towed by towing vessels. The streamers and sources may be separately towed or towed by the same vessel. If towed by separate vessels, two controllers may be employed and two residuals computed. In general, the controller may compute the residual based on what the position measurement system reports as the 3D coordinate position of the tracking point. Although there may be some degree of error in the reported 3D coordinate position due to a variety of error sources, including instrument measurement error, even with the errors the tracking point may be better controlled by steering the vessel the majority of the time.

Systems and methods of the invention may optionally be used in conjunction with other systems and methods. For example, if the center of source is the tracking point, its 3D coordinate position may be determined from acoustic ranging networks, GPS, and other position sensors, and since the seismic team knows the path the tracking point is supposed to follow based on the survey specifications, the controller may use at least that information to calculate a residual, and a set point based on the residual, for the steering algorithm, either to steer the vessel back to the survey-specified path, or ensure that the survey-specified path is adhered to.

Another aspect of the invention comprises methods of automatically controlling an inline position of a center of a marine seismic source, comprising:
(a) measuring a position of a center of a marine seismic source in a marine seismic spread;
(b) computing a residual difference between the measured position and a target position of the center of source; and
(c) steering the source using a seismic source deployment sub-system comprising one or more cables attached to the source, the cable adjusted based on the residual difference.

Methods of the invention include those wherein the computing includes use of a PI or PID controller alone or in conjunction with other controllers, and may comprise towing a seismic spread comprising a towing vessel, a seismic source, and one or more seismic streamers, which may be towed in side-by-side configuration, over/under configuration, "V" configuration, "W" configuration, or some other configuration. Other methods of the invention rely not on controlling position or steering of the sources, but in timing their firing to compensate for inline skew caused by environmental and/or other factors.

Another aspect of the invention comprises adjusting firing times of the source strings to distribute evenly any inline error due to un-even shot spacing in time or distance, rather than using mechanical actuators and controllers to correct for inline skew. One method comprises:

(a) deploying a marine seismic spread comprising a towing vessel and a seismic source, the seismic source comprising one or more source arrays each having a center of source array, each source array having one or more source strings; and (b) adjusting firing times of the source strings to distribute evenly any inline error due to un-even shot spacing in time.

Systems and methods of the invention will become more apparent upon review of the brief description of the drawings, the detailed description, and the claims that follow.

BRIEF DESCRIPTION OF THE DRAWINGS

The manner in which the objectives of the invention and other desirable characteristics can be obtained is explained in the following description and attached drawings in which:

FIGS. 3, 4, and 5 are schematic block diagrams of three embodiments of systems and methods of the invention;

FIG. 6A is partially in phantom;

Figure 1:
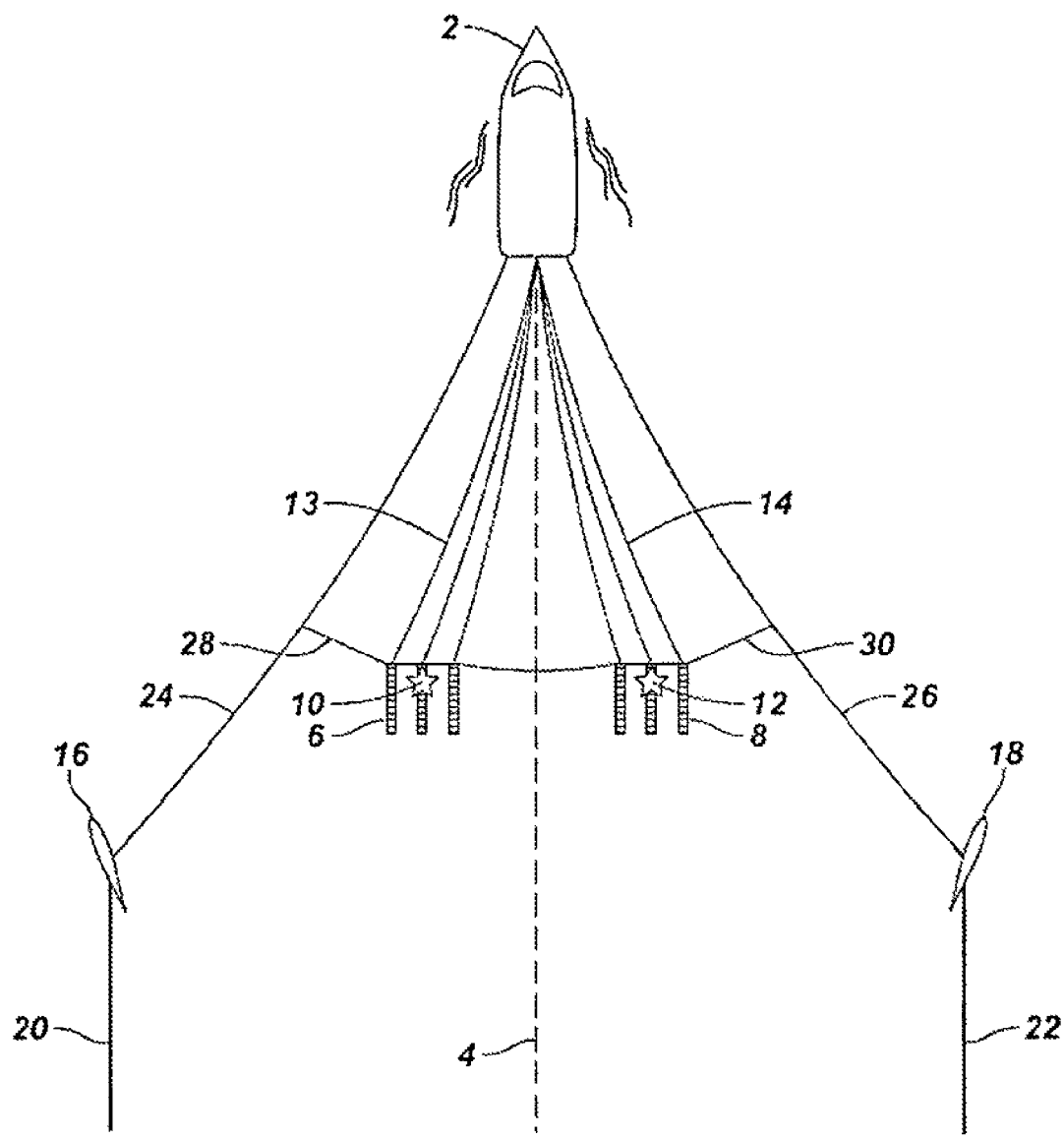
FIGS. 1 and 2 are plan or overhead views of a system useful in describing ideal conditions, and problems addressed by the systems and methods of the invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, in the discussion herein, aspects of the invention are developed within the general context of controlled positioning of seismic spread elements, which may employ computer-executable instructions, such as software program modules, being executed by one or more conventional computers. Generally, software program modules include routines, programs, objects, components, data structures, etc. that perform particular tasks or implement particular abstract data types. Moreover, those skilled in the art will appreciate that the invention may be practiced in whole or in part with other computer system configurations, including hand-held devices, personal digital assistants, multiprocessor systems, microprocessor-based or programmable electronics, network PCs, minicomputers, mainframe computers, and the like. In a distributed computer environment, software program modules may be located in both local and remote memory storage devices. It is noted, however, that modification to the systems and methods described herein may well be made without deviating from the scope of the present invention. Moreover, although developed within the general context of automatically controlling position of seismic spread elements, those skilled in the art will appreciate, from the discussion to follow, that the principles of the invention may well be applied to other aspects of seismic data acquisition. Thus, the systems and method described below are but illustrative implementations of a broader inventive concept.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present invention relates to various systems and methods for controlling position of seismic sources in a marine seismic spread primarily by steering the sources using a controller and source deployment components, the latter being a vessel that tows the seismic sources. One aspect of the present invention relates to systems including a seismic source deployment sub-system on the towing vessel, the sub-system controlled by a controller including a software module, the software module and the deployment sub-system adapted to control an inline distance between one of the centers of source array and a target coordinate. Another aspect of the invention comprises methods of using a system of the invention to control the inline position of seismic sources. An alternative method of the invention comprises timing the firing of seismic sources to compensate for inline skew.

As used herein a marine seismic "source" is a collection of air-guns or other acoustic devices designed to produce acoustic signals, or "shots," which are directed down through the water into the earth beneath, where they are reflected from the various strata.

The phrase "center of source", sometimes referred to herein as COS, means the 3D coordinate position of the center of a plurality of acoustic devices making up a source. The COS may be the 3D coordinate position of a single source array or multiple source arrays.

A "source array", as used herein, refers to a plurality of acoustic signal-producing devices arranged generally in a rectangular grid and towed by a vessel using one or more towing members, which may be active or passive. In the case of active towing members, the towing members also function to communicate pneumatic, hydraulic, or electronic signals to the individual acoustic devices in the source arrays to produce an acoustic shot. When speaking of "dual sources", typically a port source array and a starboard source array are used, and each source array has a "center of source array." Each source array may have one or a plurality of source strings, such as gun strings, and each source string may have a plurality of individual acoustic devices. Each source string may have its own towing member, but the invention is not so limited.

The phrase "center of source array", or COSA, is distinguished from COS only when there are two or more source arrays, and means the 3D coordinate position of the center of a plurality of acoustic devices making up a source array.

The phrase "streamer front end center", sometimes referred to herein as SFC, means the 3D coordinate position of a plurality of streamer front ends determined from the individual 3D coordinate positions of each streamer front end, that is, the streamer ends closest to the towing vessel.

The phrase "seismic source deployment sub-system" means any device or collection of components that are capable of functioning to position or steer source arrays in order that the COSA of each source array may be substantially aligned in a crossline generally perpendicular to a "pre-plot" line, or target vessel path. Seismic source deployment sub-systems useful in the invention they may include components that generate commands to elements, such as electric motors, winches, capstans, and other actuators, to accomplish the intended movements of the seismic sources. In some embodiments of the invention the seismic source deployment sub-system may include one or more software program modules, controllers, computers and the like, which may interact with vessel tracking and autopilots. In other embodiments of the invention the sub-system may not interact with conventional vessel tracking and autopilot functions, and may be simply one or more winches or capstans and associated controllers. In yet other embodiments of the invention, all of these components (tracking computer, autopilot, rudder controller, and thruster controllers) may be employed.

The term "spread" and the phrase "seismic spread" are used interchangeably herein and mean the total number of components, including vessels, vehicles, and towed objects including cables, sources and receivers, that are used together to conduct a marine seismic data acquisition survey.

The term "control", used as a transitive verb, means to verify or regulate by comparing with a standard or desired value. Control may be closed loop, feedback, feed-forward, cascade, model predictive, adaptive, heuristic and combinations thereof.

The term "controller" means a device at least capable of accepting input from sensors and meters in real time or near-real time, and sending commands directly to mechanical components, actuators, and the like, of a seismic source deployment sub-system, and optionally to spread control elements, and/or to local devices associated with spread control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features, as further explained herein. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the invention.

The phrase "spread control element" means a spread component that is controllable and is capable of causing a spread component to change coordinates, either vertically, horizontally, or both, and may or may not be remotely controlled.

The terms "control position", "position controllable", "remotely controlling position" and "steering" are generally used interchangeably herein, although it will be recognized by those of skill in the art that "steering" usually refers to following a defined path, while "control position", "position controllable", and "remotely controlling position" could mean steering, but also could mean merely maintaining position. In the context of the present invention, "control inline position" means using at least measured position of the COS or COSA and compare it to a pre-plot path in order to give commands to the seismic source deployment sub-system.

"Real-time" means dataflow that occurs without any delay added beyond the minimum required for generation of the dataflow components. It implies that there is no major gap between the storage of information in the dataflow and the retrieval of that information. There may be a further requirement that the dataflow components are generated sufficiently rapidly to allow control decisions using them to be made sufficiently early to be effective. "Near-real-time" means dataflow that has been delayed in some way, such as to allow the calculation of results using symmetrical filters. Typically, decisions made with this type of dataflow are for the enhancement of real-time decisions. Both real-time and near-real-time dataflows are used immediately after the next process in the decision line receives them.

The term "position", when used as a noun, is broader than "depth" or lateral (horizontal) movement alone, and is intended to be synonymous with "spatial relation." Thus "vertical position" includes depth, but also distance from the seabed or distance above or below a submerged or semi-submerged object, or an object having portions submerged. When used as a verb, "position" means cause to be in a desired place, state, or spatial relation. The term may also include orientation, such as rotational orientation, pitch, yaw, and the like.

As previously discussed herein, when conducting time-lapse and other marine seismic surveys using towed streamers and sources, conventionally, seismic source arrays are deployed so that fixed distances are maintained from the towing vessel and from the center of the first seismic recording group of the streamers. During the course of a marine data acquisition run, these distances may change due to several factors including crossline current that introduces an angle to the relation between the line from the towing cable/rope and the seismic line direction, often called feather angle when used to describe the same relation but for streamers. In addition to crossline feather, changes in the inline component of the current may alter the tension on the towing ropes for individual source arrays, which may then stretch or contract, changing the distances from the vessel to the to the source arrays, and from the source arrays to the center of the first seismic recording group. While adjustments may be made during line change, no mechanism is currently employed to control these separation distances in real time during the course of a marine seismic data acquisition run. This lack of control may result in inline differences between the source coordinates from a base and monitor 4D survey.

Figure 2:
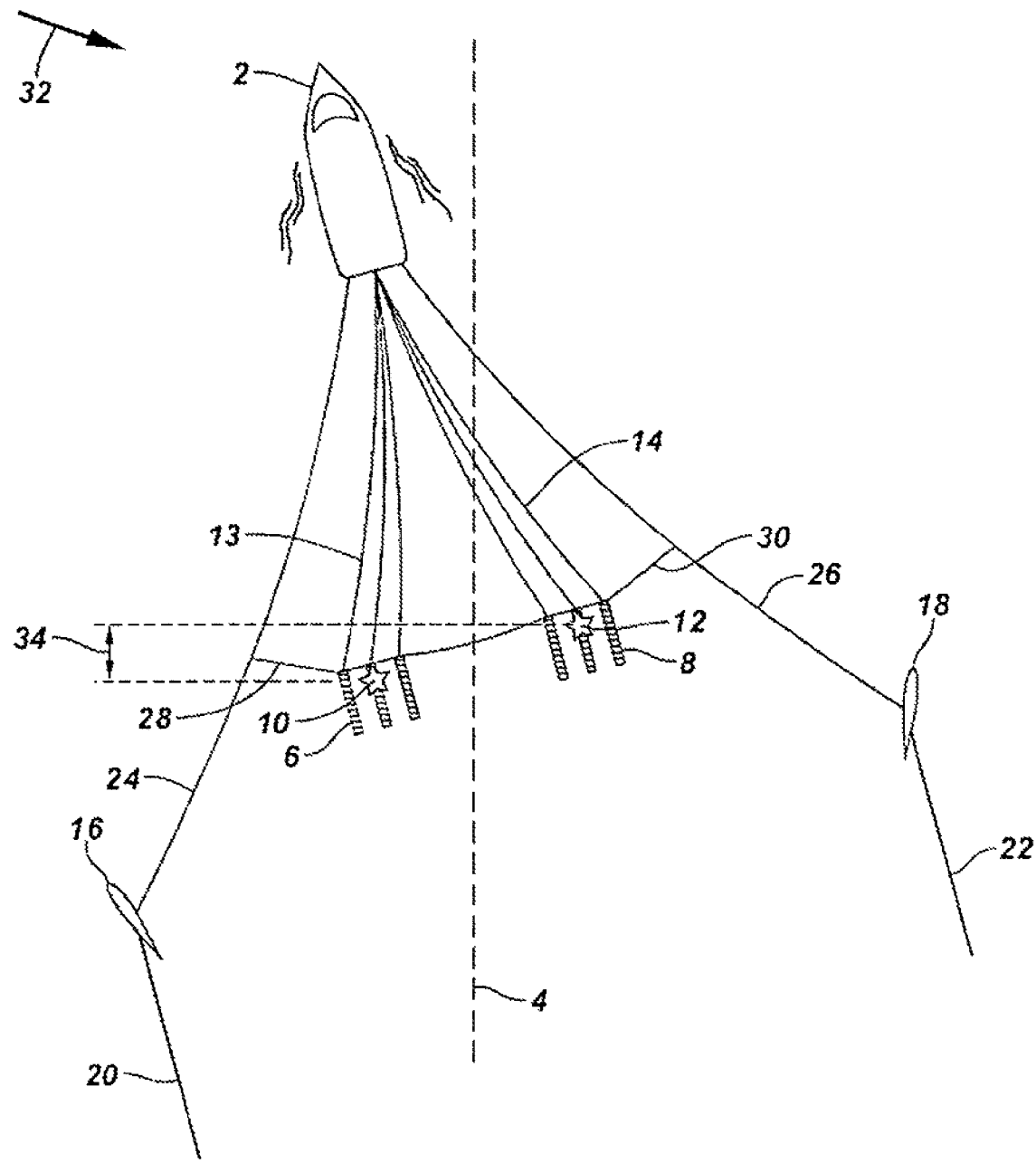

FIGS. 1 and 2 schematically illustrate a system and method useful for describing problems addressed by the inventive systems and methods. Illustrated in schematic plan view is a vessel 2 following a preplot line 4. The pre-plot line might be straight or have certain curvature. Vessel 2 is illustrated pulling two source arrays 6 and 8, each having three source strings. Source arrays 6 and 8 each have a center of source array, or COSA, indicated by a star at 10 and 12, respectively. Source array 6 is towed behind vessel 2 by a series of tow members 13 [[12]], while source array 8 is towed by a series of tow members 14. Streamer front end deflectors 16 and 18 help pull streamers 20 and 22 outward from preplot line 4, with the help of tow members 24 and 26, respectively, as well as separation ropes 28 and 30. Deflectors 16 and 18 may be of the type known under the trade designation MONOWING™, available from WesternGeco, LLC, Houston, Tex., or other type of streamer deflector. Those knowledgeable in the marine seismic industry will recognize many variations on the number of sources and streamers, configuration of streamers and tow members, and so on, and this is only one of many possible foreseeable configurations which may benefit from the teachings of the inventive systems and methods. In the arrangements illustrated, it is understood that sources and seismic streamers are towed at some depth below the water surface. Sources are typically towed at depths ranging from 0 to 10 meters, while seismic streamers may be towed at multiple depths, but are typically at depths ranging from 3 to 50 meters, depending on the survey specifications.

Referring now to FIG. 2, the system of FIG. 1 is now exposed to an ocean current, wind, and/or waves represented by arrow 32. The same numerals are used throughout to designate same components unless otherwise mentioned. Vessel 2 must turn into the environmental conditions in order to maintain a path close to preplot line 4. However, this action by vessel 2 results in inline skewing of the spread, and specifically inline skew of COSAs 10 and 12 as represented by double-headed arrow 34. In 4D seismic data acquisition scenarios, this presents a problem, specifically that some percentage of the seismic data will not be useful.

Prior to the systems and methods of the invention, the operator viewed the source arrays and streamers, and perhaps took into consideration wind, wave and current data, in steering the vessel in an effort to keep the streamers and the center of source on their respective track lines, while also minimizing inline skew. Systems and methods have been devised to automate the steering feedback loop, by introducing an automatic controller that controls vessel position in such a way that the source is on or close to the desired preplot line; however, these systems do not account for inline skew as depicted schematically in FIG. 2. Thus even if the source and streamers are on their respective preplot tracks, the COSAs may be experiencing inline skew. Systems and methods of the invention are meant to correct for this inline skew. The systems and methods of the invention may also utilize measurements of environmental conditions, including but not limited to wind magnitude and direction, and current magnitude and direction. Other options include using a feed-forward technique, where a separate controller may be added that takes these environmental conditions into account and performs a proactive reaction so as to minimize the environmental effect on the zero inline slew objective. If other factors are found to impact the zero inline skew objective, feed-forward control aspects from these factors may also be included. By performing these functions automatically, an optimally tuned PID and optionally a feed forward, or other controller strategy will command an algorithm within the seismic source deployment sub-system so that deviations from the inline skew objective is corrected rapidly and in a stable way.

Figure 3:
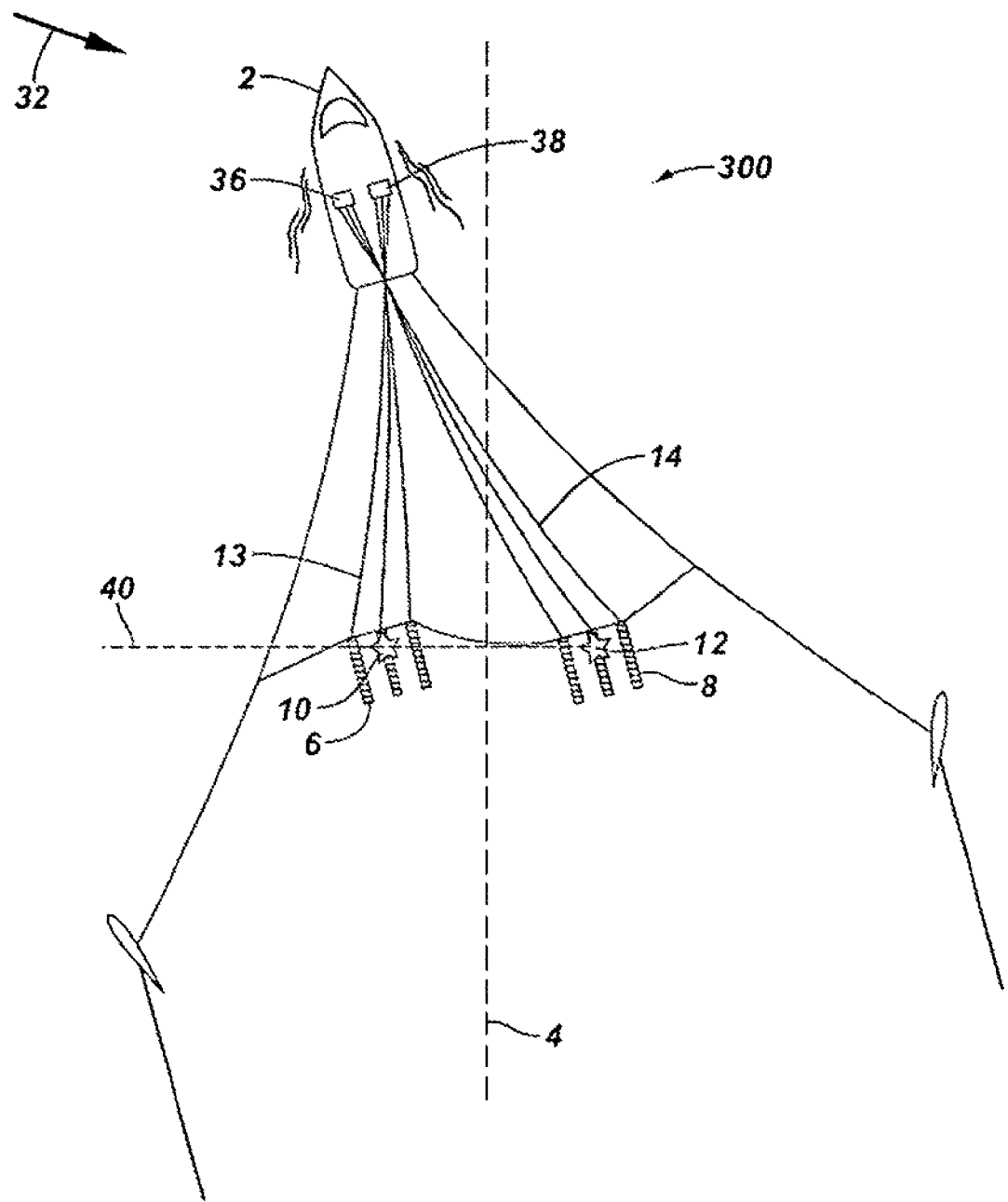
Figure 4:
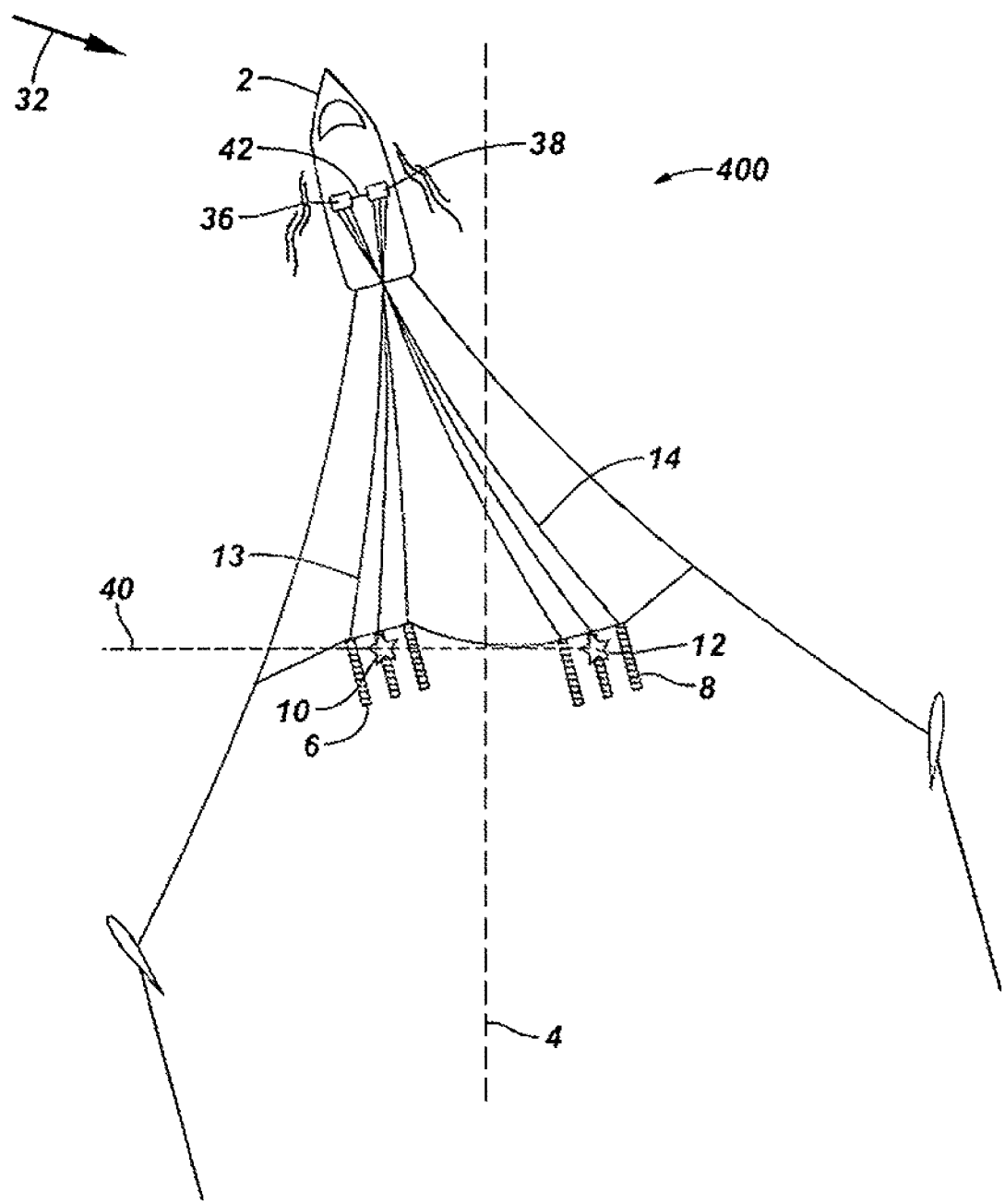

FIGS. 3, 4, and 5 are schematic block diagrams of three non-limiting embodiments of systems and methods of the invention for controlling inline position of COSAs 10 and 12 in dashed line 40. FIG. 3 illustrates a system and method 300 for compensating for inline skew by dynamically actuating otherwise existing actuators, where three actuators 36 may be independently and dynamically actuated, one for each of three port tow members 13, while three other actuators 38 may also be independently and dynamically actuated for three starboard tow members 14. It will be understood that more or less than three actuator/tow member combinations may be employed. In this embodiment the actuators, which may be winches or equivalent actuators, such as capstans, do not move in relation to vessel 2 other than to dynamically reel in and reel out the tow members, and operation of one actuator does not interact with the other actuators. Operation of these types of actuators in marine seismic data acquisition, other than the real time or near real time dynamic features of the invention, is well-known and requires no further explanation to the skilled artisan. In certain embodiments, the dynamic reeling in and out of actuators 36 and 38 are automatically controlled in incremental fashion by one or more controllers, each of which may comprise one or more software program modules. The controller may comprise a simple PI or PID feedback loop. For example, a PID controller would compare a set point inline skew of COSAs 10 and 12 with measured 3D coordinate positions of the COSAs, and calculate a difference, referred to herein as a residual or residual difference, and generate a command to actuators 36 and 38 as the case may be to incrementally reel in or reel out the tow members 13 and 14. It will be understood that in certain embodiments, rather than the controllers sending commands directly to actuators 36 and 38, the controllers may send commands to a vessel autopilot, vessel tracking device, or both the tracking device and autopilot, and command the vessel rudder and/or vessel thrusters. However, in other embodiments, the response time of the actuators 36 and 38 may be faster when the controllers send commands directly to the actuators to incrementally reel in and out the tow members, and correct for inline skew of COSAs 10 and 12. In either case the result should be better control of COSAs 10 and 12 inline as depicted in dashed line 40.

FIG. 4 illustrates another system and method 400 for compensating for inline skew by dynamically actuating three actuators 36, one for each of three port tow members 13, while three other actuators 38 are dynamically actuated for three starboard tow members 14. In this embodiment the actuators again do not move in relation to vessel 2 other than to dynamically reel in and reel out the tow members. However, in embodiment 400, actuators 36 and 38 are modified so that port and starboard sides are synchronized. In other words, as actuators 36 incrementally reel in tow members 13 because of environmental conditions 32, a synchronizing connection 42 ensures that actuators 38 incrementally reel out tow members 14. If environmental conditions 32 were in the opposing direction, then as actuators 36 incrementally reel out tow members 13, synchronizing connection 42 ensures that actuators 38 incrementally reel in tow members 14. Embodiment 400 allows load balancing through the synchronizing connection. Load balancing may be used in any of the embodiments of the invention, except embodiment 300 of FIG. 3 which is a non-synchronized, non-balanced embodiment. Load balancing is primarily used to decrease energy requirements and/or increase energy efficiency.

FIG. 5 illustrates another system and method embodiment 500 of the invention in schematic block diagram fashion. System and method embodiment 500 illustrated in FIG. 5 includes certain features not present in embodiments 300 and 400. In embodiment 500, actuators 36 and 38 may once again be three port and three starboard winches, respectively, but each actuator 36 and 38 is movable forward and aft on a movable platform (not shown) controlled by one or more controllers commanding movements of a mechanism 44. Mechanism 44 as illustrated in FIG. 5 may comprise a motorized capstan or other suitable arrangement having a connection to each movable platform associated with actuators 36 and 38. In certain embodiments, one movable platform is employed for three winches, and in embodiment 500, two movable platforms are thus utilized, although the invention is not so limited. Alternatively, each actuator 36 and 38 may be controlled by its own motorized capstan. As depicted in FIG. 5, mechanism 44 allows load balancing as discussed herein, although this is optional. Actuators 36 and 38 may travel on tracks or rails, for example, as discussed in U.S. Pat. No. 5,284,323 with regard to laterally movable reels for streamer deployment. Although this patent discusses tracks for laterally moving reels for streamers, some of the principles are applicable to the inventive systems and methods. Actuators 36 and 38 may be winches movably attached to and capable of traversing forward and aft in separate tracks on the deck of vessel 2. Separate traversing motors and chains may provide one means known to those skilled in the art to effect the traversal of actuators 36 and 38 over these tracks. Traversing motors may cause chains to rotate over a course along the length of each track, while the winches or reels may ride on a frame (not shown) mounted on wheels that engage the tracks. The frame may be connected to an element of chain such that as the chain circles, winch 36 or 38 as the case may be is carried forward and aft by means of the rolling of the frame wheels over the track. Other equivalent means for effecting the traversal of an actuator over a track will be well known and recognized by those skilled in the art. For instance, a rod with left and right spiral grooves could be caused to rotate. The frame could be attached to an element that rides within the grooves of the rod such that when the rod is rotated, the element causes the winch to be urged forward or aft.

Figure 6A:
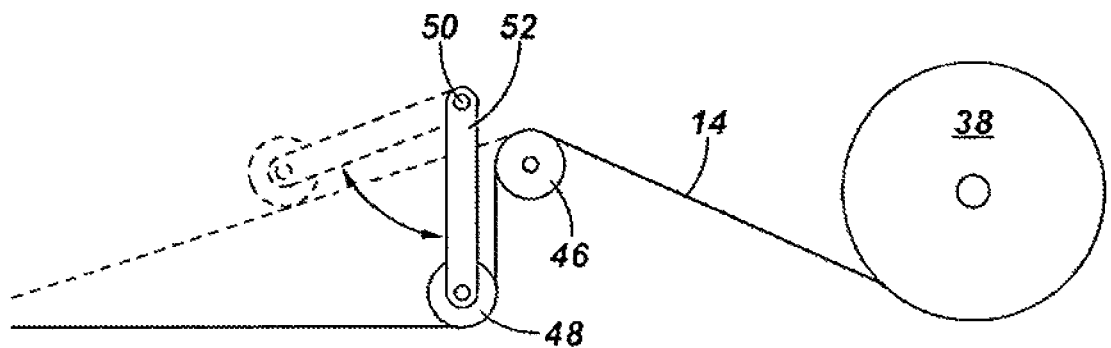
FIGS. 6A and 6B are schematic diagrams of a feature of the inventive systems and methods, where
Figure 6B:
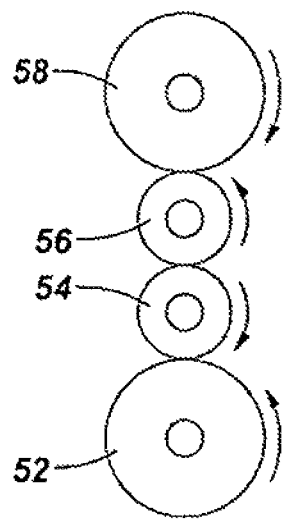

FIGS. 6A and 6B are schematic diagrams of a feature of the inventive systems and methods which may be used with any of the various embodiments. Inline compensation may be supplemented by adding optional port and starboard heave compensators. A starboard compensator is illustrated schematically in side elevation, partially in phantom, in FIG. 6A, employing a first, stationary wheel 46 and a second, slack take up wheel 48. As tow member 14 is reeled in and out, or even when in a static position, the heaving up and down of vessel 2 by wave action, wind, or other environmental factors, may cause tow member 14 to experience slack, which can adversely result in inline skew of COSAs 10 and 12. A pivot 50 and mounted pivot arm 52 allows slack take up wheel 48 to pivot as indicated by the double-headed arrow. The phantom position of pivot arm 52 and wheel 48 illustrates a situation when there is relatively no heave. FIG. 6B illustrates schematically how gears 54 and 56 may be employed in conjunction with a starboard pivot 50 and a port pivot 58 for rotation in opposite directions and load balancing.

Figure 7:
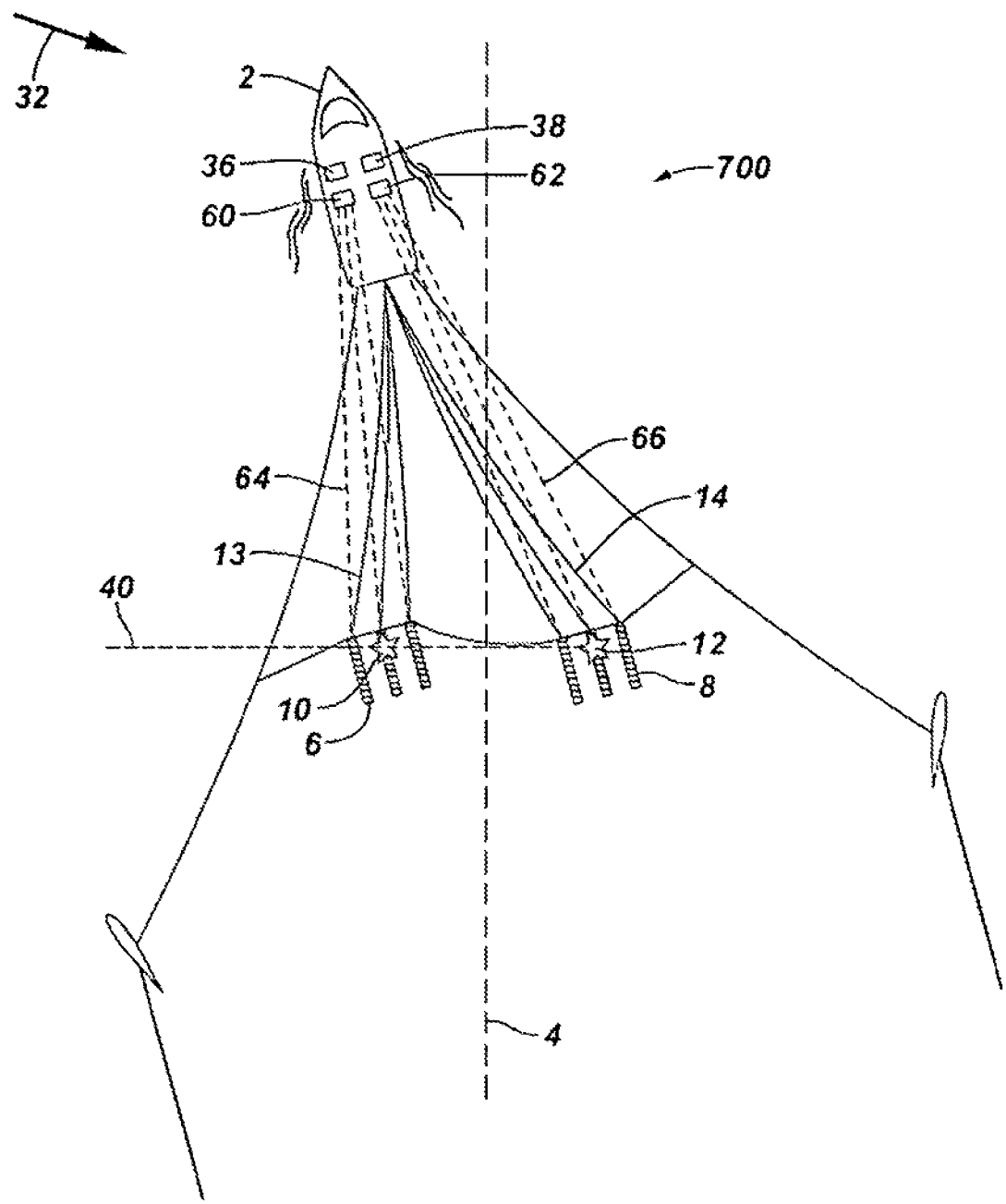
FIGS. 7, 8, 9, and 10 are schematic block diagrams of four other embodiments of systems and methods of the invention.

FIG. 7 illustrates schematically another embodiment 700 where in addition to actuators for tow members 13 and 14, separate extra actuators 60 and 62 are provided. In certain embodiments, one extra actuator is provided for each tow member 13 and each tow member 14. In embodiment 700 illustrated schematically in FIG. 7, six extra actuators (winches, capstans, or the like) are provided, along with three extra tow members 64 and three extra tow members 66. Extra tow members 64 terminate at and are attached to, in this embodiment, the lead end of each acoustic string in sub-array 6. Similarly, extra tow members 66 terminate at and are attached to, in this embodiment, the lead end of each acoustic string in sub-array 8.

Figure 8:
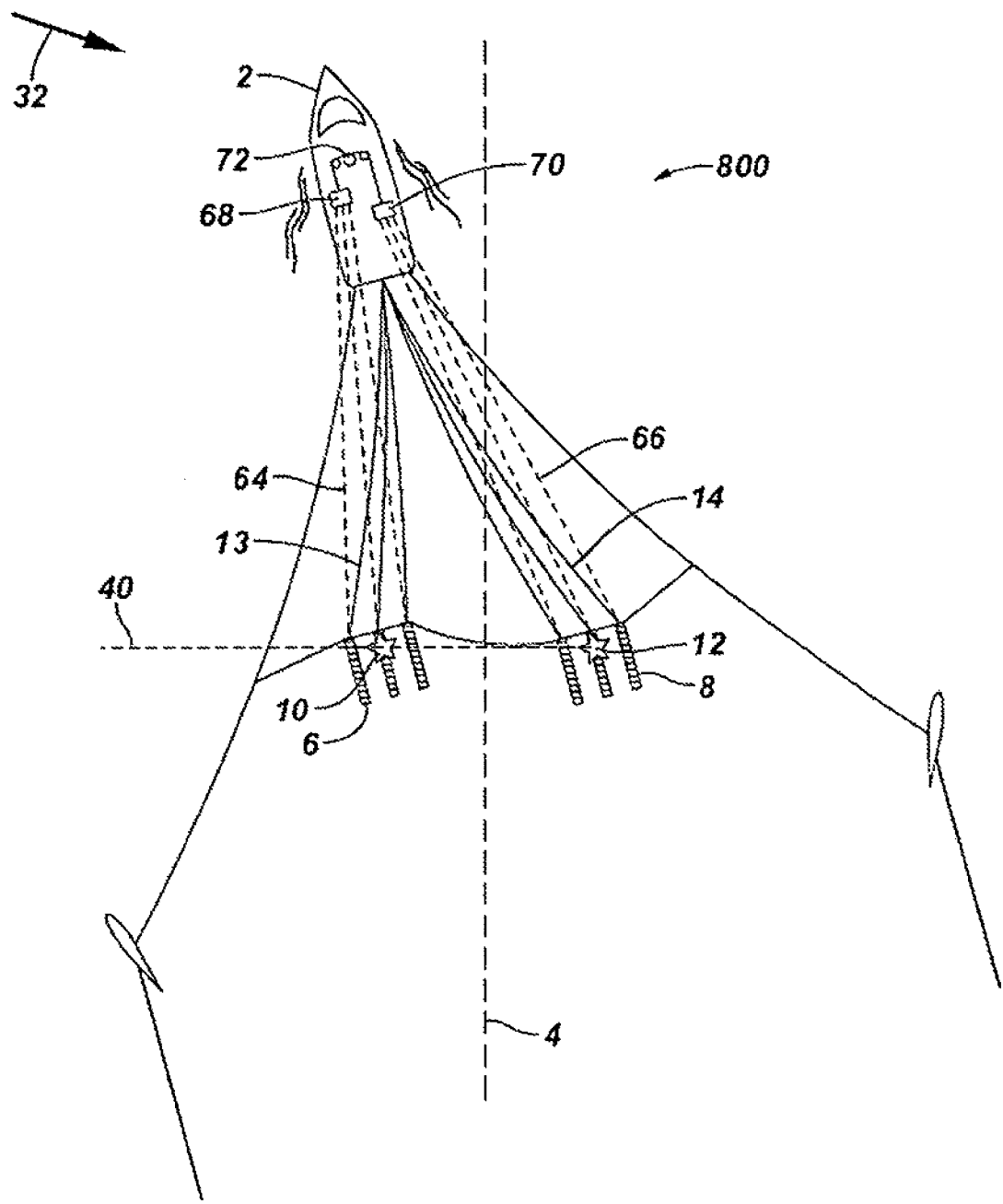

Embodiment 800 of FIG. 8 combines features of embodiment 700 of FIG. 7 with embodiment 500 of FIG. 5. In embodiment 800, extra actuators 68 and 70 may once again be three port and three starboard winches, respectively, but each extra actuator 68 and 70 is movable forward and aft on a movable platform (not shown) controlled by one or more controllers commanding movements of a mechanism 72. Mechanism 72 as illustrated in FIG. 8 may comprise a motorized capstan or other suitable arrangement having a connection to each movable platform associated with extra actuators 68 and 70. In certain embodiments, one movable platform is employed for three winches, and in embodiment 800, two movable platforms are thus utilized, although the invention is not so limited. Alternatively, each extra actuator 68 and 70 may be controlled by its own motorized capstan. As depicted in FIG. 8, mechanism 72 allows load balancing as discussed herein, although this is optional. Extra actuators 68 and 70 may travel on tracks or rails, for example, as discussed in embodiment 500, or any other suitable arrangement. The result is better control of inline skew of COSAs 10 and 12 in the dashed line designated 40.

Figure 9:
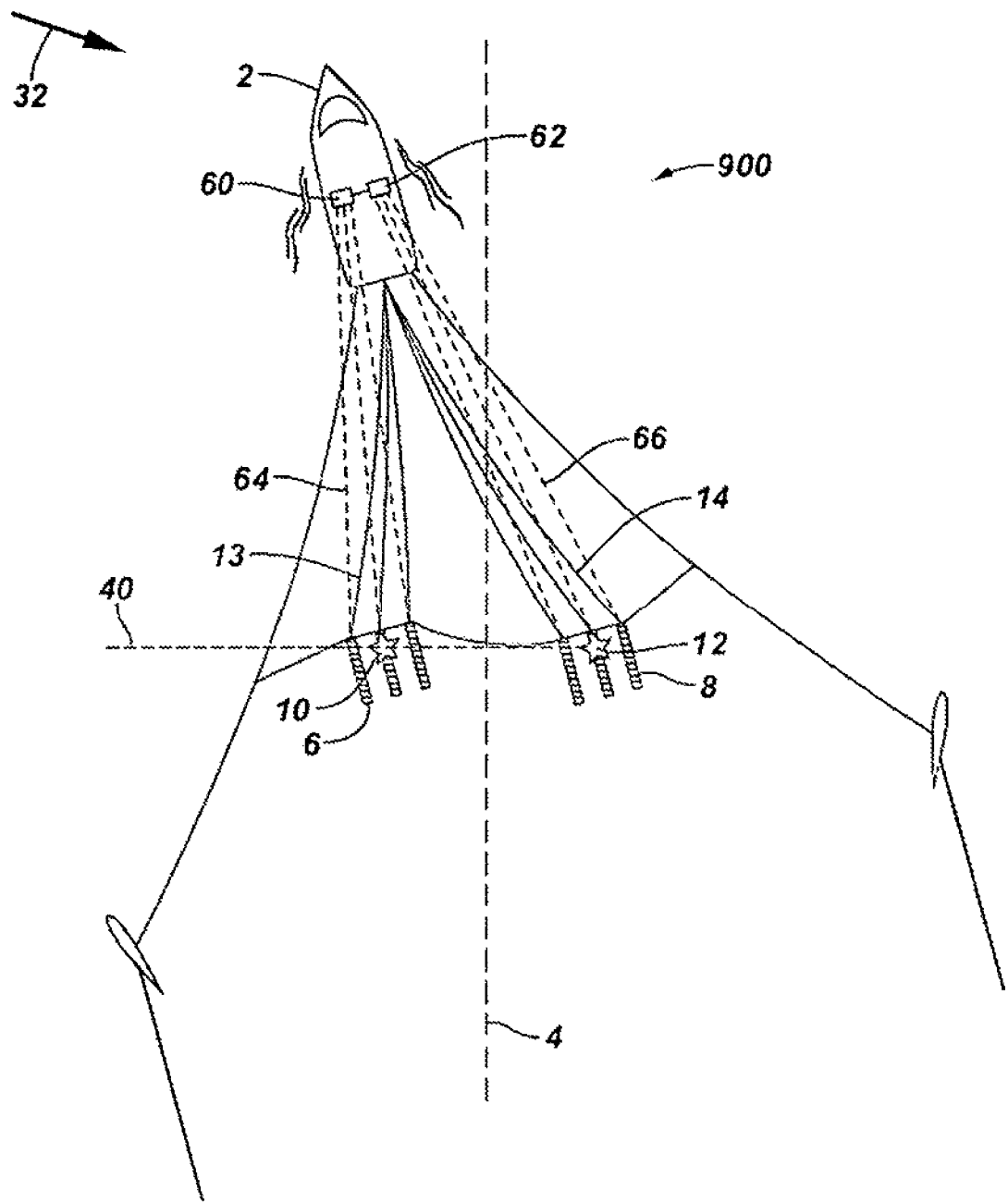

FIG. 9 illustrates another embodiment 900 of systems and methods of the invention. In embodiment 900, all twelve actuators (three port acoustic source string actuators (not shown), three starboard source string actuators (not shown), three extra port actuators 62 for tow members 66, and three extra starboard actuators 60 for tow members 64) are synchronized. Port and starboard extra actuators 60 and 62 are operated so that one side gives out while the other side takes in their respective tow members 64 and 66.

Figure 10:
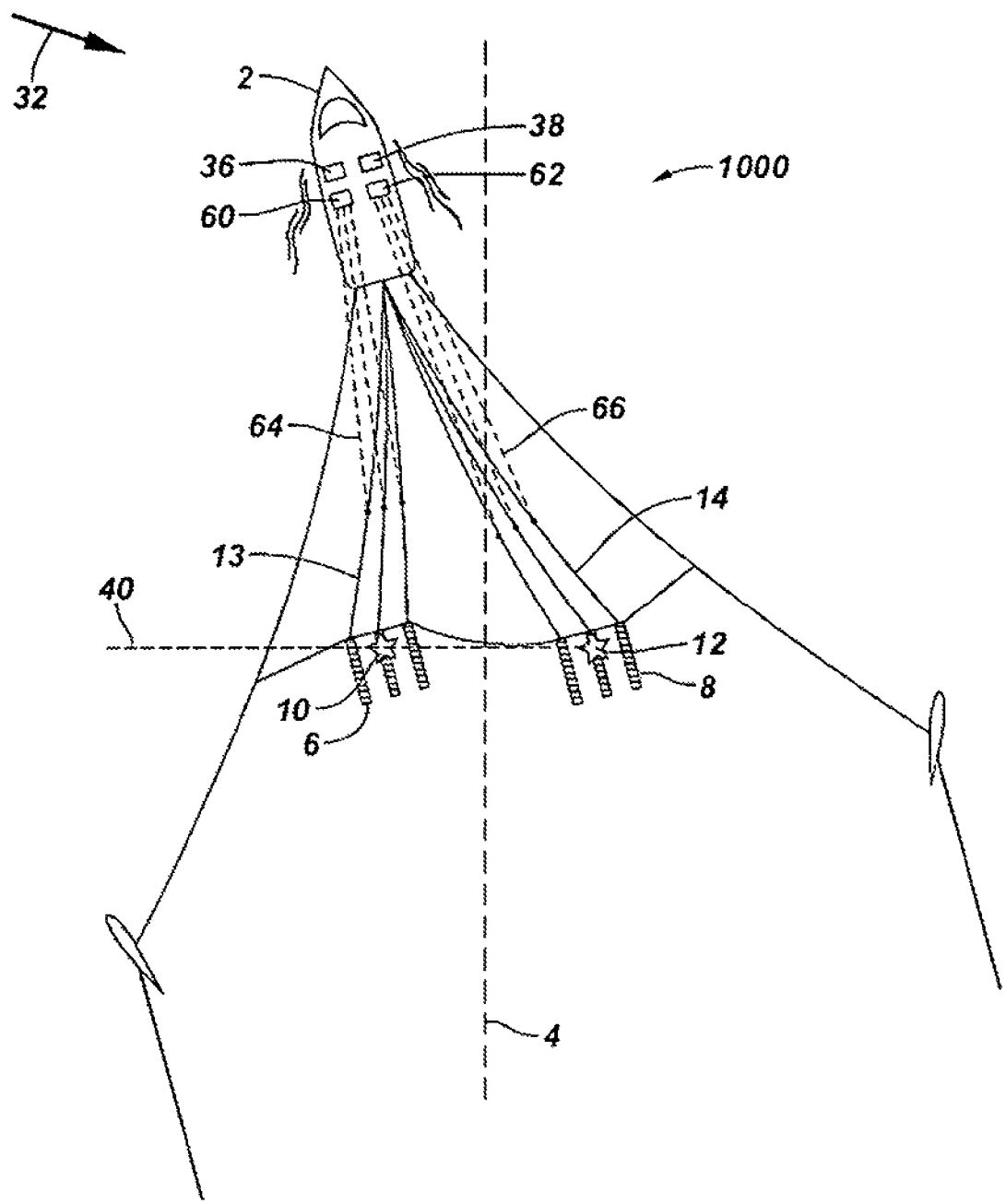

FIG. 10 illustrates yet another system and method embodiment 1000, which is identical to embodiment 700 of FIG. 7 except for the terminal connection point of tow members 64 and 66. In embodiment 1000 tow members 64 and 66 are connected near midpoints of respective tow members 13 and 14, but this location of connection may vary, depending on the degree of control required, the forces required, the expected environmental conditions, the physical characteristics of tow members 64 and 66 (such as strength, elasticity, and the like), and other factors.

Controllers useful in the invention may be Model Predictive (MP) controllers rather than PID controllers. The characteristics of each are discussed herein below. MP controllers may be mono-variable or multivariable MP controllers, and may use a pre-existing mathematical model of the system in conjunction with measured disturbances on the system, such as wind, currents, and the like, to calculate residuals and generate commands. Modification of set points by a feedforward controller may optionally feed historical, real time or near-realtime, or future predictions of data regarding current and/or wind as a modification to set points. In either embodiment, steering of source strings will then influence the inline skew in a more controlled and stable fashion using an MP controller and feed-forward controller, rather than an MP controller alone, or a human operator.

As should now be evident, using the systems and methods of the invention the operator does not have to perform manual control, and this may result in:
- an objective reaction not dependent on operator skill level and alertness;
- control reaction with little or no delay;
- proactive response to current and other environmental factors with feed forward options; and
- more frequent update rates.

The systems of the invention may be used in conjunction with conventional crossline spread control devices. These devices include source steering devices and streamer steering devices. Such devices are often part of the spread and towed by the vessel.

Controllers useful in the systems and methods of the invention may vary in their details. One PID controller useful in the invention may be expressed mathematically as in Equation 1:

$$u(t)=K_p[e(t)+1/T_i\cdot\int e(t)dt+T_d\cdot\dot{e}(t)] \quad (1)$$

wherein

∫ means integrate;

$\dot{e}(t)$ means the time derivative;

u(t) is controller output to an actuator, typically measured in meters of inline skew;

e(t) means difference between wanted (planned, reference) inline position and measured (current position) inline value;

$T_d$ is a constant for describing the derivative part of the algorithm (the derivative part may be filtered to avoid deriving high frequencies);

$T_i$ is a constant for describing the integrating part of the algorithm; and $K_p$ is a proportional gain constant.

In the s-plane (Laplace), the PID controller may be expressed as (Equation 2):

$$H_r(s)=K_p[1+1/T_is+T_ds/(1+T_fs)] \quad (2)$$

wherein s is the variable in the s-plane; and $T_f$ is a constant describing the filtering part of the derivative part of the algorithm.

For discretization, a variety of transforms may be employed, and some constants may or may not be useful. For example, $T_r$ constant may not be necessary in some instances, but may be especially useful in other scenarios. As one discretization example, the z-transform may be used, meaning that the integral part of the algorithm may be approximated by using a trapezoid model of the form (Equation 3):

$$s=(1-_{Z-1})/T \quad (3)$$

while the derivative part may be approximated using an Euler model (Equation 4):

$$s=2/T\cdot(1-_{Z-1})/(1+_{Z-1}) \quad (4)$$

wherein T is the sampling time.

The resulting discrete model may then be used directly in the steering algorithm. Other discrete models, derived using other transforms, are useful in the invention, and will be apparent to control technicians or control engineers of ordinary skill.

Model Predictive Control (MPC) is an advanced multivariable control method for use in multiple input/multiple output (MIMO) systems. An overview of industrial Model Predictive Control can be found at: www.che.utexas.edu/.about.qin/cpcv/cpcv14.html. MPC computes a sequence of manipulated variable adjustments in order to optimise the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2 . . . MPC may use any derived objective function, such as Quadratic Performance Objective, and the like, including weighting functions of manipulated variables and measurements. Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like. It may be difficult to explicitly state stability of an MPC control scheme, and in certain embodiments of the present invention it may be necessary to use nonlinear MPC. In so-called advance spread control of marine seismic spreads, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC. Mono-variable or multivariable model predictive controllers could substitute for one or more of the PID controllers in various embodiments.

Feed forward algorithms, if used, will in the most general sense be task specific, meaning that they will be specially designed to the task it is designed to solve. This specific design might be difficult to design, but a lot is gained by using a more general algorithm, such as a first or second order filter with a given gain and time constants.

All embodiments of the invention may include a modification of the set point signal by a feed-forward controller, which may optionally feed historical, real time or near-real time, or future predictions of data regarding currents, wind, and other environmental conditions or information regarding obstructions in the designated survey area, and the like.

Figure 11:
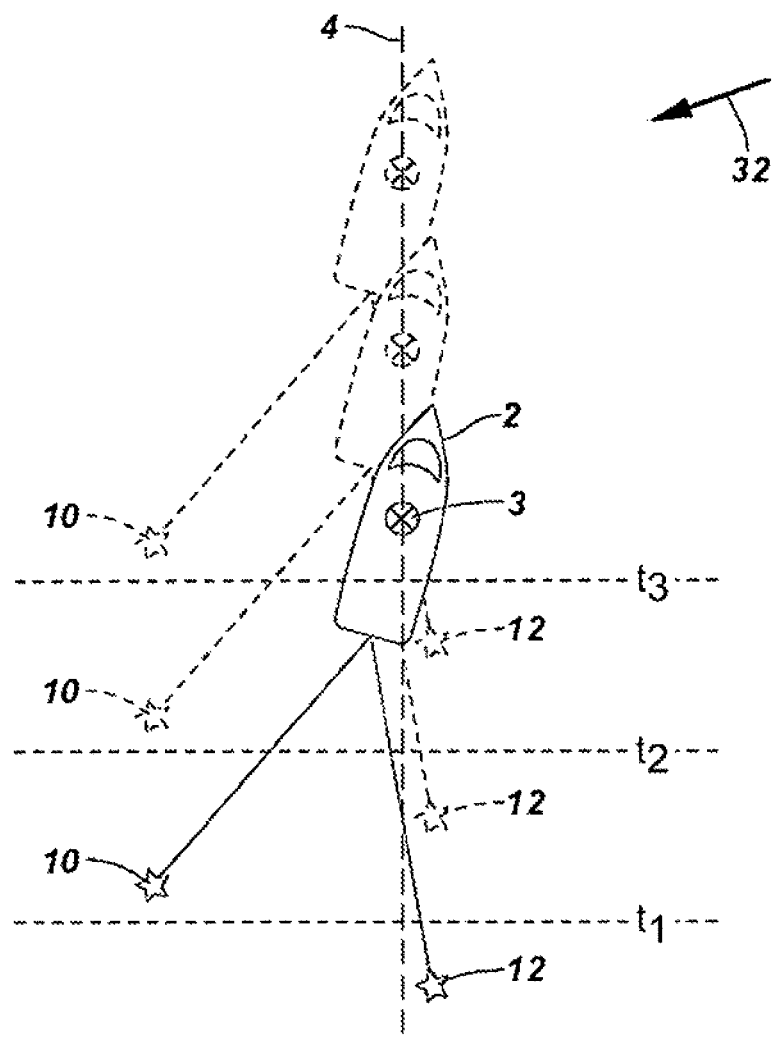
FIG. 11 illustrates schematically another method of the invention.

FIG. 11 illustrates another method of the invention, comprising adjusting firing times of the source strings to distribute evenly any inline error due to un-even shot spacing in time or distance, rather than using mechanical actuators and controllers to correct for inline skew. FIG. 11 illustrates the point of un-even shot spacing in time or distance, showing two sources 10 and 12 at three different times t1, t2, and t3. The center of vessel 2 is indicated at 3. For repeat surveys that aim to repeat the source positions from the base survey, this is of course also a major problem, as it will be very difficult to match the inline component of the source positions if the source feathering of the subsequent survey does not match the source feathering experienced in the base survey. Another factor to consider is that the chance of overlapping shots (two shots fired into the same shot record) is reduced if the shot interval (in time) is increased. This could be done by adjusting the vessel speed in order to:

1. maximize efficiency (i.e. vessel moves as fast as possible, around .about.5 knots, or 2.5 m/s); and 2. avoid overlapping shots.

Figure 12:
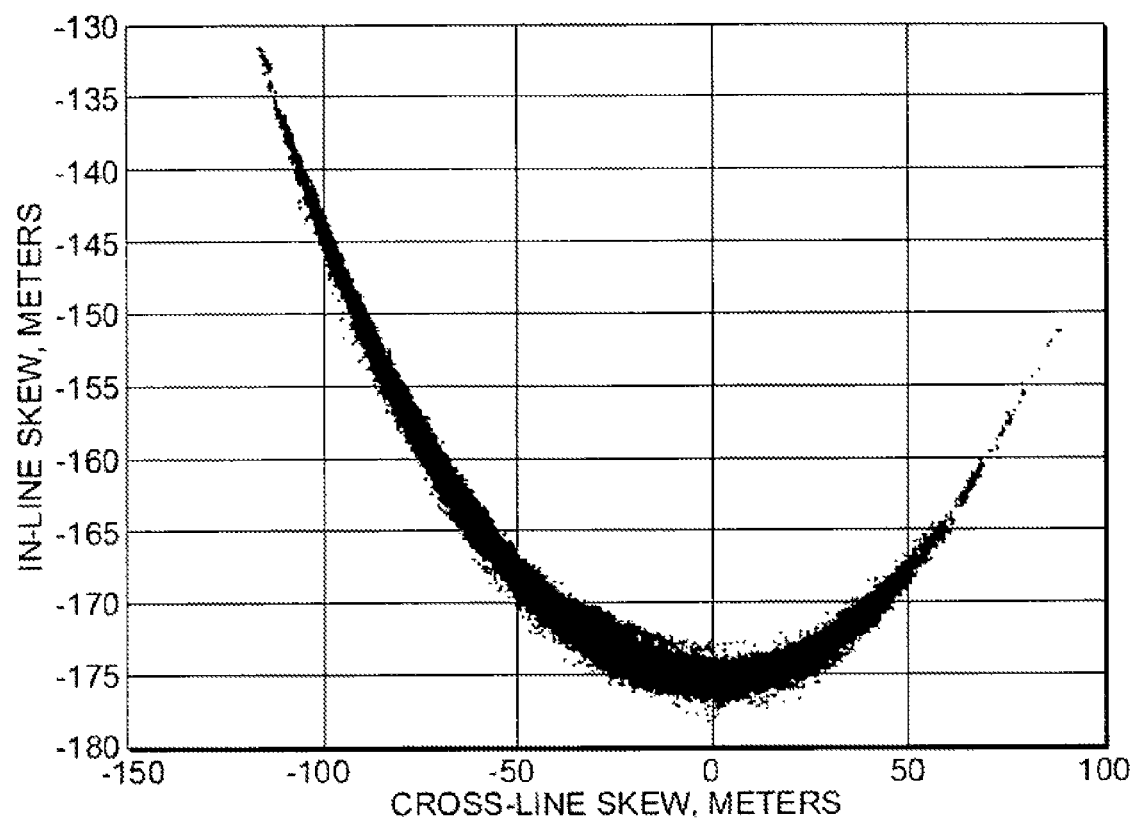
FIG. 12 illustrates is an image from an analysis of an actual seismic data survey, showing all the shots from that particular survey as dots, and illustrating the influence from external forces (e.g. currents) on inline skew.

FIG. 12 is an image from an analysis of an actual seismic data survey. It shows all the shots from that particular survey as dots. If there had been no influence from external forces (e.g. currents) and the vessel had been steering straight, all the dots would have been found on point (0,−175), as the source was towed 175 m behind the vessel for this particular survey. As can be seen, however, due to currents pushing the source array to the sides (mostly to port side), the inline error was increased (exceeding 40 m in the extreme cases). If there are no crossline currents causing source feather, the vessel speed could be adjusted to maximize efficiency of data collection. In a dual source arrangement, as soon as crossline current starts to affect the inline distance between the center of the two sources, the shot controller may be programmed to try to compensate by adjusting the firing times. As long as there is no shot overlap, the vessel speed may remain constant. If the source feather increases to a point where there is a chance of overlapping shot records, the system decides whether to slow the vessel down, or to freeze the triggering times (i.e. no further adjustment) to avoid overlapping shots. (The decision on which to choose may vary from survey to survey).

Un-even shot spacing in time or distance may be partially fixed by adjusting firing times, and using the geometric midpoint between the sources to distribute the error evenly, as depicted in FIG. 11. Although none of these techniques can fully compensate for inline skew, the technique illustrated in FIG. 11 has been implemented in an existing shot controller. The implementation is, however, not straightforward. FIG. 11 illustrates an example with a record shot length of 6.0 seconds, a nominal shot spacing of 18.75 m; a vessel speed of 5 knots, or 2.5 m/s; source layback of 300 m; and a source feather of 5°. For these conditions, it can be shown that the inline skew is about 4.35 m. It was found that if the shot time period was held constant at 7.5 seconds, and the shot spacing distance was varied as 14.4 m–23.1 m–14.4 m–23.1 m, the inline skew could be reduced without significant shot overlap. If, rather than vaying the shot spacing distance, the shot spacing distance remained constant at 18.75 m, and the shot time period varied in time as follows, 5.75 s–9.25 s–5.75 s–9.25 s, an unacceptable amount of shot overlap was found.

The systems and methods of the invention may be used in many spread embodiments. For example, for obtaining deg-hosted seismic data, it may be possible to provide one or more seismic streamers with a companion seismic streamer where the companions are towed in over/under fashion. The vertical distance between seismic streamers in an over/under seismic streamer pair may range from 1 meter to 50 meters, and may be about 5 meters. A selected number of hydrophones, either mounted within the seismic streamer or in/on equipment mounted onto the seismic streamer, may be used as receivers in an acoustic ranging system and thereby provide knowledge of the horizontal, vertical and inline position of COSAs as well as seismic streamers.

In use, systems and methods of the invention are particularly adept for 3D and so-called 4D marine seismic data acquisition surveys. More specifically, the systems and methods of the invention may be integrated into the seismic towing vessel steering strategy, and may be integrated into positioning strategies for spread elements other than seismic sources. In time-lapse or so-called 4D seismic, the source and receivers may be positioned to within a few meters of a baseline survey in order to gather a good picture of the evolution of a reservoir over time. The geophysical requirement for the accuracy of the repositioning varies with the geological structure and the expected time-difference signal, but generally a 10 meter positioning discrepancy is allowed, and often a bigger mismatch is allowed due to practicalities regarding the historical repositioning abilities. It is desired to position the source to within 5 meters, and the streamers to within about 10 meters of their previous tracks. Computing a residual difference between the 3D coordinate position and a pre-plot 3D coordinate position of a COS or COSA point may be helpful in order to meet these targets as it allows for corrective actions to be taken before it is too late. One use of systems and methods of the invention is to make approximate inline positioning of COSAs by using controllable actuators, and to fine tune by use of compensation devices such as those described in reference to FIGS. 6A and 6B.

Systems and methods of the invention may interact with any number of spread control elements, which may include one or more orientation members, a device capable of movements that may result in any one or multiple straight line or curved path movements of a spread element in 3-dimensions, such as lateral, vertical up, vertical down, horizontal, and combinations thereof. The terms and phrases "bird", "cable controller", "streamer control device", and like terms and phrases are used interchangeably herein and refer to orientation members having one or more control surfaces attached thereto or a part thereof. A "steerable front-end deflector" (or simply "deflector") such as typically positioned at the front end of selected streamers, such as 16 and 18 in the figures, and other deflecting members, such as those that may be employed at the front end of seismic sources or source arrays, may function somewhat to influence inline skew, although their purpose is primarily to correct for crossline and depth positions. Orientation members are primarily used to pull streamers and steer sources laterally with respect to direction of movement of a tow vessel. Horizontal separation between individual source strings may range from about 10 to about 100 meters, and the horizontal or crossline source string separation may be consistent between one source string and its nearest neighbors. Horizontal and/or vertical control of streamers may be provided by orientation members which may be of any type as explained herein, such as small hydrofoils or steerable birds that can provide forces in the vertical and/or horizontal planes. One suitable orientation member is the device known under the trade designation Q-FIN™, available from WesternGeco LLC, Houston, Tex., and described in U.S. Pat. No. 6,671,223, describing a steerable bird that is designed to be electrically and mechanically connected in series with a streamer; another suitable device is that known under the trade designation DigiBIRD™, available from Input/Output, Inc., Stafford, Tex. Other streamer positioning devices, such as the devices described in U.S. Pat. Nos. 3,774,570; 3,560,912; 5,443,027; 3,605,674; 4,404,664; 6,525,992 and EP patent publication no. EP 0613025, may be employed.

Systems of the invention may communicate with the outside world, for example another vessel or vehicle, a satellite, a hand-held device, a land-based device, and the like. The way this may be accomplished varies in accordance with the amount of energy the system requires and the amount of energy the system is able to store locally in terms of batteries, fuel cells, and the like. Batteries, fuel cells, and the like may be employed, and wireless communication may be sufficient. Alternatively, or in addition, there may be a hard-wire power connection and a hard wire communications connection to another device, this other device able to communicate via wireless transmission.

Certain systems and methods of the invention may work in feed-forwarded fashion with existing control apparatus and methods to position not only the seismic sources, but streamers as well. Sources and streamers may be actively controlled by using GPS data or other position detector sensing the position of the COSA or streamer (e.g. underwater acoustic network), or other means may sense the orientation of one or more COSAs or individual streamers (e.g. compass) and feed this data to navigation and control systems. While gross positioning and local movement of center of source and/or streamer front end center may be controlled via controlling the actuators and controllers herein described, fine control may be accomplished on some other vessel, locally, or indeed a remote location. By using a communication system, either hardwire or wireless, environmental information ahead of the vessel may be sent to one or more local controllers, as well as the controllers of systems of the invention. The local controllers may in turn be operatively connected to spread control elements comprising motors or other motive power means, and actuators and couplers connected to the orientation members (flaps), and, if present, steerable birds, which function to move the spread components as desired. This in turn may adjust the position of a spread element or COSA, causing it to move as desired. Feedback control may be achieved using local sensors positioned as appropriate depending on the specific embodiment used, which may inform the local and remote controllers of the position of one or more COSAs, crossline distance between source arrays and streamers, a position of an actuator, the status of a motor or hydraulic cylinder, the status of a steerable bird, and the like. A computer or human operator can thus access information and control the entire positioning effort, and thus obtain much better control over the seismic data acquisition process.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures. Thus, although electronic and hydraulic motion platforms may not be structural equivalents in that an electronic motion platform employs one type of actuator, whereas a hydraulic motion platform employs a different type of actuator, in the environment of movable platforms, electronic and hydraulically actuated movable platforms may be equivalent structures.

What is claimed is:

1. A system comprising:
a marine seismic spread comprising a towing vessel and a seismic source, the seismic source comprising at least one seismic source array having a center; and
a seismic source deployment sub-system on the towing vessel, the sub-system controlled by a controller including a software module, the software module and the deployment sub-system adapted to control an inline distance between the source array center and a target coordinate without regard to the crossline distance therebetween.

2. The system of claim 1 wherein one or more seismic streamers are towed by the towing vessel, or a separate towing vessel.

3. The system of claim 1 wherein the seismic source deployment sub-system comprises one or more actuators.

4. The system of claim 3 wherein the seismic source includes a plurality of source strings and the individual source strings are actuated pneumatically or electronically through individual active cables wound or unwound from actuators.

5. The system of claim 3 wherein the one or more actuators include a port side actuator and a starboard side actuator and the port side actuator can be wound a substantially similar amount as the starboard side actuator is unwound, or vice versa.

6. The system of claim 1 wherein the source deployment sub-system comprises both active source tow members and passive steering tow members.

7. The system of claim 6 wherein the length of active source tow members are not controlled but are allowed to move inline, while a set of separate passive tow members are connected either to the active tow members or the sources themselves, and the passive tow members do not actuate the sources, but their inline lengths are controlled by separate deployment systems to control an inline distance between the center of the seismic source and the target coordinate.

8. The system of claim 1 wherein the seismic source deployment sub-system comprises one or more movable actuators, wherein the actuators ride on one or more movable platforms on the vessel.

9. The system of claim 8 wherein the software module controls both the movable platform and the actuators.

10. The system of claim 1 comprising heave compensators, whereby the length of either active source tow members or passive steering tow members are adjusted by exerting a force on the tow member.

11. The system of claim 1 wherein the seismic source deployment sub-system is load-balanced.

12. The system of claim 1 wherein the controller and software module are physically a part of the seismic source deployment sub-system.

13. The system of claim 1 wherein the controller computes a residual equal to a difference between a target point 3D coordinate position and an actual position of the center of the seismic source to produce one or more inputs to one or more cable deployment actuators, which may be electric motors, used by the seismic source deployment sub-system to control the source inline positions using actuators.

14. The system of claim 13 wherein the controller computes the residual continuously or non-continuously.

* * * * *